United States Patent
Kang et al.

(10) Patent No.: US 9,820,354 B2
(45) Date of Patent: Nov. 14, 2017

(54) LIGHT EMITTING DEVICE AND AUTOMOTIVE LIGHTING INCLUDING THE SAME

(71) Applicant: LG INNOTEK CO., LTD., Seoul (KR)

(72) Inventors: Bong Woo Kang, Seoul (KR); Jun Ho Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/238,996

(22) Filed: Aug. 17, 2016

(65) Prior Publication Data

US 2017/0055327 A1 Feb. 23, 2017

(30) Foreign Application Priority Data

Aug. 20, 2015 (KR) .......................... 10-2015-0117194
Apr. 29, 2016 (KR) .......................... 10-2016-0053574

(51) Int. Cl.
*H05B 33/08* (2006.01)
*B60Q 1/00* (2006.01)
(Continued)

(52) U.S. Cl.
CPC ......... *H05B 33/0896* (2013.01); *B60Q 1/076* (2013.01); *B60Q 1/14* (2013.01); *B60Q 1/30* (2013.01); *B60Q 1/34* (2013.01); *B60Q 1/44* (2013.01); *F21S 48/215* (2013.01); *F21S 48/217* (2013.01); *F21S 48/328* (2013.01);
(Continued)

(58) Field of Classification Search
CPC ............ H05B 33/0896; H05B 33/0812; H05B 33/0842; H05B 33/0815; H05B 33/0809; H05B 33/0803; H05B 33/0824; H05B 33/0827; H05B 33/083; H05B 33/0887; H05B 33/0884; H05B 33/089; B60Q 1/30; B60Q 1/44; B60Q 1/34; B60Q 1/14; B60Q 1/0094; B60Q 1/04; B60Q 1/18; B60Q 2300/314; F21S 48/328; F21S 48/217; F21S 48/215; H02M 3/1582; F21Y 2115/15; F21Y 2115/10
See application file for complete search history.

(56) References Cited

U.S. PATENT DOCUMENTS 8,536,806 B2 * 9/2013 Kitagawa ........... H05B 33/0812
 315/186
8,957,601 B2 * 2/2015 Tikkanen ........... H05B 33/0803
 315/294

(Continued)

*Primary Examiner* — Vibol Tan
(74) *Attorney, Agent, or Firm* — KED & Associates, LLP

(57) ABSTRACT

A light emitting device is provided. The light emitting device may include a plurality of light emitting array modules each including at least one light emitting element, and a common driving module commonly connected to the plurality of light emitting array modules and configured to supply an operating voltage to each of the connected light emitting array modules. Each of the plurality of light emitting array modules may include a light emitting module including the at least one light emitting element and an individual driving module configured to receive the operating voltage supplied from the common driving module and output an operating current to the light emitting module based on the received operating voltage.

14 Claims, 13 Drawing Sheets

(51) Int. Cl.
  *B60Q 1/30* (2006.01)
  *B60Q 1/44* (2006.01)
  *B60Q 1/34* (2006.01)
  *F21S 8/10* (2006.01)
  *H02M 3/158* (2006.01)
  *B60Q 1/076* (2006.01)
  *B60Q 1/14* (2006.01)
  *F21V 29/74* (2015.01)
  *H02M 3/155* (2006.01)

(52) U.S. Cl.
  CPC ............ *F21V 29/74* (2015.01); *F21V 29/745* (2015.01); *H02M 3/1582* (2013.01); *H05B 33/0812* (2013.01); *H05B 33/0815* (2013.01); *H05B 33/0842* (2013.01); *H02M 3/155* (2013.01)

(56) References Cited

U.S. PATENT DOCUMENTS

| | | | | |
|---|---|---|---|---|
| 9,154,031 B2* | 10/2015 | Weng | ................. | H02M 3/156 |
| 2006/0215416 A1* | 9/2006 | Lucas | ................. | B60Q 1/076 |
| | | | | 362/545 |
| 2014/0097749 A1* | 4/2014 | Kim | ................. | H05B 33/089 |
| | | | | 315/82 |
| 2015/0008895 A1* | 1/2015 | Weng | ................. | H02M 3/156 |
| | | | | 323/285 |
| 2015/0035509 A1* | 2/2015 | Koyama | ............... | H02M 3/157 |
| | | | | 323/283 |
| 2016/0227616 A1* | 8/2016 | Lee | ................. | H05B 33/0815 |

* cited by examiner

LIGHT EMITTING DEVICE AND AUTOMOTIVE LIGHTING INCLUDING THE SAME

CROSS-REFERENCE TO RELATED APPLICATIONS

The present application claims priority under 35 U.S.C. §119 to Korean Patent Application No. 10-2015-0117194 filed on Aug. 20, 2015 and No. 10-2016-0053574 filed on Apr. 29, 2016, whose entire disclosures are incorporated herein by reference.

BACKGROUND

1. Field

Embodiments relate to a light emitting device including a light emitting module and a driving module.

2. Background

A light emitting diode (LED) may be widely used as a light emitting module. Use of an organic light emitting diode (OLED) is also increasing because the OLED has excellent color reproduction and a fast driving speed as compared to the LED. Applications of such a light emitting module may be expansive. For example, the light emitting module may be used as a high-luminance light source for a flash, a back light for a liquid crystal display (LCD) used in a portable electronic product such as, e.g., a mobile phone, a camcorder, a digital camera, a personal digital assistant (PDA), a light source for an electronic display, a light source for illumination and switch illumination, and/or a light source for a pilot lamp and traffic light. A light emitting module may receive driving power supplied by a driving module and may generate light by using the received driving power. Such a light emitting module may be referred to as an LED array module (LAM), and the driving module may be referred to as an LED drive module (LDM).

Referring to FIG. 1, a light emitting device 10 according to related art may include a plurality of driving modules and a plurality of light emitting modules. The plurality of light emitting modules may include a first light emitting module 20, a second light emitting module 30, and an $N^{th}$ light emitting module 40. The plurality of driving modules may supply an operating voltage to the plurality of light emitting modules. The plurality of driving modules may include a first driving module 50 that supplies the operating voltage to the first light emitting module 20, a second driving module 60 that supplies the operating voltage to the second light emitting module 30, and an $N^{th}$ driving module 70 that supplies the operating voltage to the $N^{th}$ light emitting module 40. The first to $N^{th}$ light emitting modules 20, 30, and 40 may be installed at different positions of a vehicle. For example, the first to $N^{th}$ light emitting modules 20, 30, and 40 may include a front lamp including a day running light (DRL), a position lamp (PSTN), and/or a turn signal lamp (TSL), and a rear combination lamp including a stop lamp, a tail lamp, a turn signal lamp, a backup lamp, and/or a fog lamp.

Referring to FIG. 2, each of the plurality of driving modules may include a power input 81 that receives power, a constant voltage circuit 82 that converts the power received through the power input 81, and a constant current circuit 83 that supplies the power converted by the constant voltage circuit 82 to a that corresponds light emitting module. The constant voltage circuit 82 may not be configured to cover all of the first to $N^{th}$ light emitting modules 20, 30, and 40, but may output a voltage suitable for an operating voltage of a specific light emitting module controlled by the constant voltage circuit 82. Similar to the constant voltage circuit 82, the constant current circuit 83 may output a constant current control suitable for an operating current of a specific light emitting module controlled by the constant current circuit 83. The plurality of driving modules may be designed for specific light emitting modules controlled by the driving modules and individually configured according to the number of light emitting modules.

However, if the light emitting device 10 is configured as described above, the number of driving modules may be increased to as many as a number of light emitting modules. This increase of the driving modules may increase unit costs and increase loss of product development.

BRIEF DESCRIPTION OF THE DRAWINGS

The embodiments will be described in detail with reference to the following drawings in which like reference numerals refer to like elements wherein.

DETAILED DESCRIPTION

Figure 1:
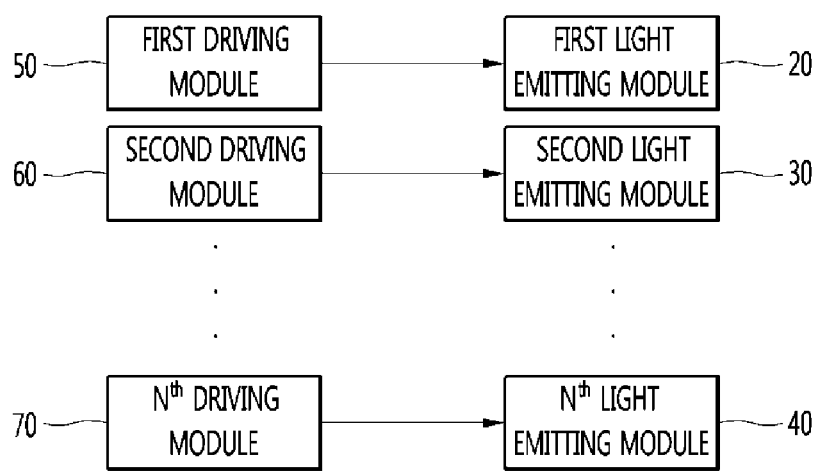
FIG. 1 is a view of a light emitting device according to related art.
Figure 2:
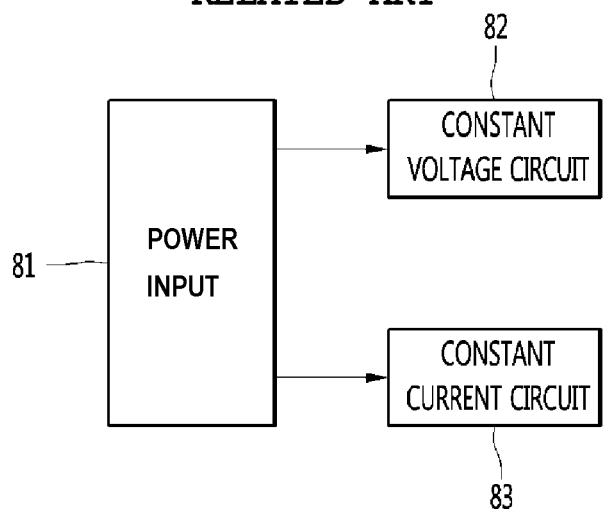
FIG. 2 is a view of a driving module of FIG. 1.
Figure 3:
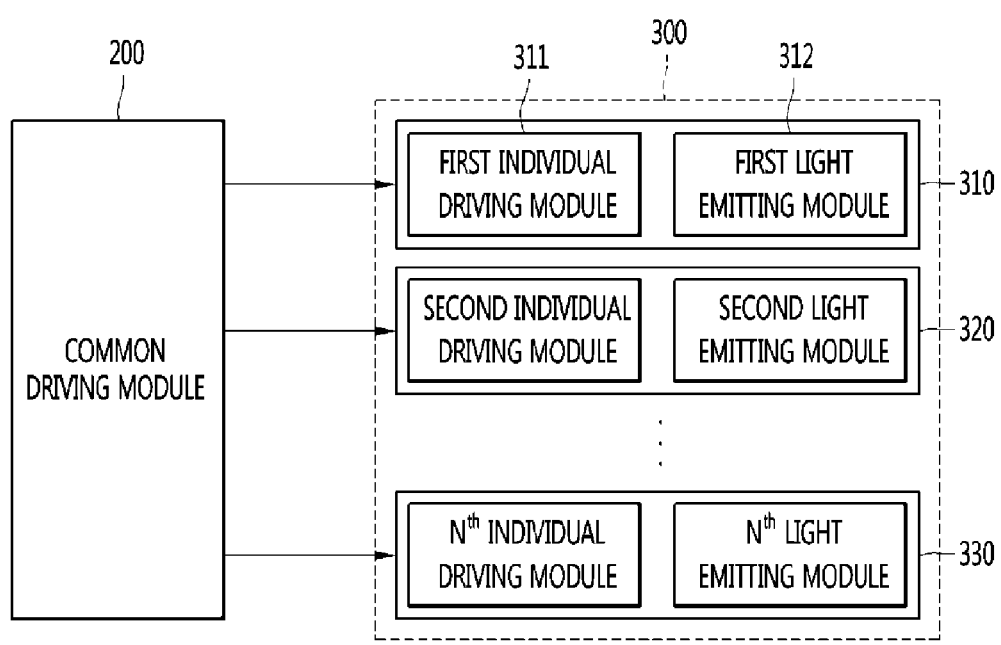
FIG. 3 is a view of a light emitting device according to an embodiment.

Referring to FIG. 3, a light emitting device 100 according to an embodiment may include a common driving module 200 and a light emitting array module 300. The light emitting array module 300 may include first to $N^{th}$ light emitting array modules 310, 320, and 330. Each of the first to $N^{th}$ light emitting array modules 310, 320, and 330 may include an individual driving module 311 and a light emitting module 312.

In the embodiment, a driving module that supplies driving power to the light emitting module 312 may include a fixed unit and a variable unit. The fixed unit may be a module in which a same internal circuit may be designed regardless of load specifications of the light emitting module 312. The fixed unit may be a driving module in which an internal circuit design may not be changed even though load specifications of the light emitting module 312 may be changed, and the variable unit may be a driving module in which an internal circuit design may be changed according to load specifications of the light emitting module 312.

Accordingly, the driving module may be divided into a common driving module that corresponds to the fixed unit, and an individual driving module that corresponds to the variable unit. The individual driving module may not be arranged on a same substrate as the common driving module, thereby reducing a size of the common driving module and minimizing a heat generation problem.

The individual driving module 311 may not be configured separately from the light emitting module 312, but may be provided as a single integrated module integrated with the light emitting module 312. The internal circuit of the individual driving module 311 may be designed according to specifications of a that corresponds light emitting module 312. The individual driving module 311 may include only some driving circuits except for the common driving module 200, thereby minimizing a heat generation problem caused by integration with the light emitting module 312.

The common driving module 200 may be commonly connected to the first to $N^{th}$ light emitting array modules 310, 320, and 330 and output the operating voltage to the first to $N^{th}$ light emitting array modules 310, 320, and 330. A same operating voltage may be inputted from the common driving module 200 to the first to $N^{th}$ light emitting array modules 310, 320, and 330. The light emitting modules 312 constituting the first to $N^{th}$ light emitting array modules 310, 320, and 330 may be configured with different specifications, and a difference may occur in a required operating voltage (VF). The first to $N^{th}$ light emitting array modules may include, for example, a module that corresponds to a rear portion of the vehicle, a module that corresponds to a turn signal portion, and a module that corresponds to a stop signal portion.

When the operating voltage inputted from the common driving module 200 is higher than an actually required operating voltage, a normal operating voltage may be supplied to the light emitting module 312 by the individual driving module 311. When the operating voltage inputted from the common driving module 200 is lower than the actually required operating voltage, the normal operating voltage may not be supplied to the light emitting module 312. In the common driving module 200, a maximum operating voltage (VF. Max) among the operating voltages of the light emitting modules 312 included in the first to $N^{th}$ light emitting array modules 310, 320, and 330 may be set as a reference voltage ($V_{ref}$). The common driving module 200 may adjusts an output voltage (Vo) based on the set reference voltage ($V_{ref}$).

For example, the common driving module 200 may adjust the output voltage (Vo) based on the reference voltage ($V_{ref}$) through a constant voltage control. The output voltage (Vo) outputted from the common driving module 200 may be commonly inputted to the first to $N^{th}$ light emitting array modules 310, 320, and 330. Each of the first to $N^{th}$ light emitting array modules 310, 320, and 330 may receive the output voltage (Vo) outputted from the common driving module 200, perform the constant current control based on the received output voltage (Vo) and the output voltage (Vo) to the that corresponds light emitting module 312.

Each of the light emitting modules 312 may operate based on power supplied by the constant current control to generate light at an installation position. The first to $N^{th}$ light emitting array modules 310, 320, and 330 may be lamps installed at different positions of the vehicle to generate light at the installation positions.

The first to $N^{th}$ light emitting array modules 310, 320, and 330 may include a first light emitting array module that corresponds to a day running light (DRL), a second light emitting array module that corresponds to a position lamp (PSTN), a third light emitting array module that corresponds to a turn signal lamp (TSL), a fourth light emitting array module that corresponds to a stop lamp, a fifth light emitting array module that corresponds to a tail lamp, a sixth light emitting array module that corresponds to a turn signal lamp, a seventh light emitting array module that corresponds to a backup lamp, an eighth light emitting array module that corresponds to a fog lamp, and a ninth light emitting array module that corresponds to a headlight.

In the first to $N^{th}$ light emitting array modules 310, 320, and 330, the specifications or number of light emitting elements constituting the light emitting module 312 may be changed according to the load specifications. Accordingly, each of the first to $N^{th}$ light emitting array modules 310, 320, and 330 may include the individual driving module 311 that controls power supplied to each light emitting module 312 according to specifications of each light emitting module 312.

The individual driving module 311 may include a constant current control circuit that performs a constant current control. As described above, the driving module for driving the light emitting module 312 may be divided into the common driving module that corresponds to the fixed unit, and the individual driving module that corresponds to the variable unit. The common driving module 200 may be commonly connected to the plurality of light emitting array modules and output the common output voltage (Vo) to the plurality of light emitting array modules.

Each of the plurality of light emitting array modules may include a light source module, and an individual driving module that controls the output voltage (Vo) according to specifications of the light source module. As described above, the lighting emitting device according to the embodiment may be standardized so that some of the driving modules may be used in common in the plurality of light emitting modules, thereby reducing the number of driving modules and minimizing unit costs and product volume.

The lighting emitting device according to the embodiment may integrate the individual driving module and the light emitting module into a single package, thereby reducing product volume and unit costs. Only the constant current control circuit, except for the constant voltage control circuit or the like, may be included in the driving module integrated with the light emitting module, thereby minimizing a heat generation problem caused by integration of the driving module and the light emitting module.

Figure 4:
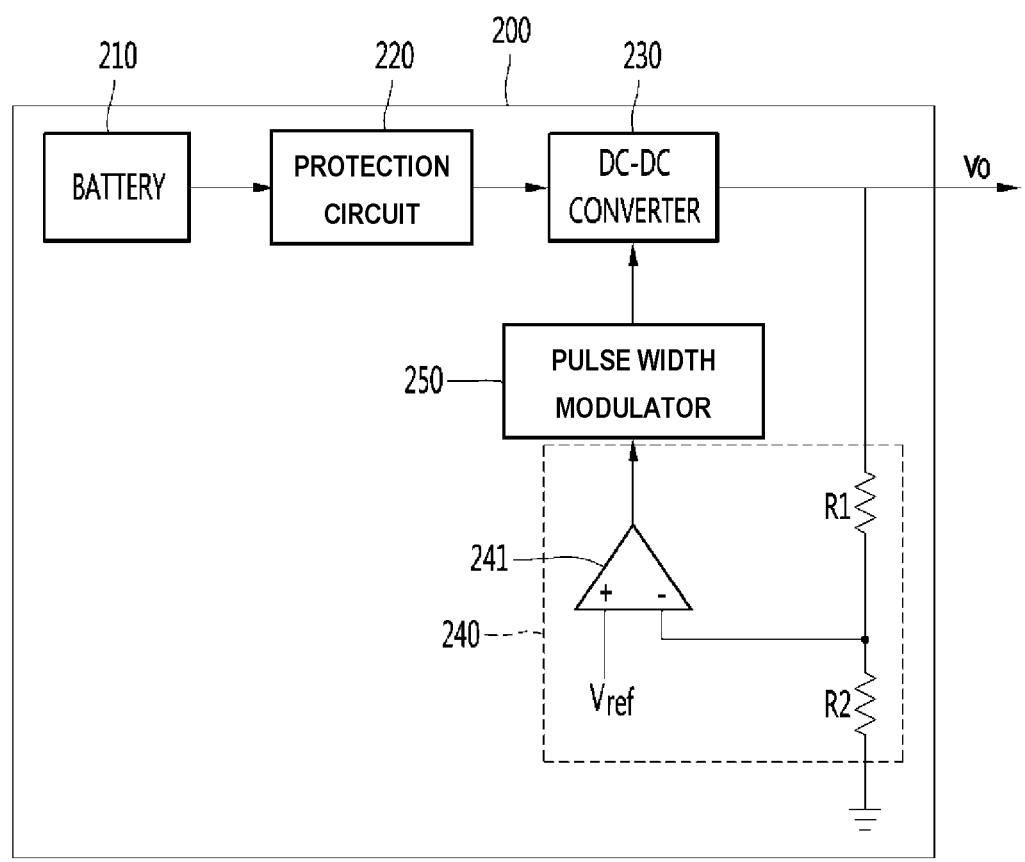
FIG. 4 is a view of a common driving module of FIG. 3.

Referring to FIG. 4, the common driving module 200 may include a battery 210, a protection circuit unit or protection circuit 220, a DC-DC converter 230, a feedback unit or circuit 240, and a pulse width modulation unit or modulator 250. The battery 210 may supply input power that drives the plurality of light emitting modules 312 to the common driving module 200. The battery 210 may be a power supply that supplies the input power and may be replaced with another unit.

The battery 210, as illustrated in FIG. 4, may be included in the common driving module 200, but the battery 210 may be configured separately from the common driving module 200 because the battery 210 is a unit that supplies the power to the common driving module 200. When the light emitting device is used in a vehicle lamp, the battery 210 may be a vehicle battery and the common driving module 200 may be arranged above a substrate separated from the battery 210. The battery 210 may be configured to supply DC power to the DC-DC converter 230, but is not limited thereto. The input power may be in a range of about 9 V to about 16 V, but is not limited thereto.

The protection circuit 220 may be configured to protect the internal configuration of the common driving module 200 from the power inputted to the common driving module 200. The protection circuit 220 may be arranged between the battery 210 and the DC-DC converter 230 and may block or absorb a noise or electromagnetic wave emitted from a device and discharged through a power line or may bypass the noise or electromagnetic wave to the ground. The protection circuit 220 may further include a reverse voltage protection circuit that prevents a voltage from being applied in a reverse direction.

The DC-DC converter 230 may adjust a voltage received from the protection circuit 220 according to a pulse signal outputted through the pulse width modulator 250 to be described below, and may commonly output the adjusted voltage to the first to $N^{th}$ light emitting array modules 310, 320, and 330. The DC-DC converter 230 may adjust the voltage received from the protection circuit 220 based on a preset reference voltage ($V_{ref}$), and output the adjusted voltage to the first to $N^{th}$ light emitting array modules 310, 320, and 330. The DC-DC converter 230 may be one of a buck-boost converter, a boost converter, a buck converter, a buck & boost converter, a Zeta converter, and a SEPIC converter.

The pulse width modulator 250 may be arranged between the DC-DC converter 230 and the feedback circuit 240 and may generate a pulse signal to adjust the output voltage Vo of the DC-DC converter 230, based on an output signal of the feedback circuit 240, and control a switching state of a switching element or switch constituting the DC-DC converter 230 according to the generated pulse signal.

The feedback circuit 240 may include a comparator 241, and a first resistor R1 and a second resistor R2 connected in series to an output terminal of the DC-DC converter 230. One terminal of the first resistor R1 may be connected to the output terminal of the DC-DC converter 230, and the other terminal of the first resistor R1 may be connected to one terminal of the second resistor R2. The one terminal of the second resistor R2 may be connected to the other terminal of the first resistor R1, and the other terminal of the second resistor R2 may be grounded.

The first resistor R1 and the second resistor R2 may be voltage-dividing resistors and may detect and output the output voltage Vo of the DC-DC converter 230. The comparator 241 may be configured with an operational amplifier (op-amp). A reference voltage $V_{ref}$ may be inputted to a positive (+) terminal of the comparator 241, and a voltage divided through the first resistor R1 and the second resistor R2 may be applied to a negative (−) terminal of the comparator 241.

The feedback circuit 240 may output a difference value between the reference value $V_{ref}$ and the output voltage Vo to the pulse width modulator 250 so that the output voltage Vo of the DC-DC converter 230 may converge to the preset reference voltage $V_{ref}$. Accordingly, the pulse width modulator 250 may output the pulse signal to compensate the output value of the DC-DC converter 230 based on the difference value, and the DC-DC converter 230 may output the output voltage Vo that corresponds to the reference voltage $V_{ref}$.

Figure 5:
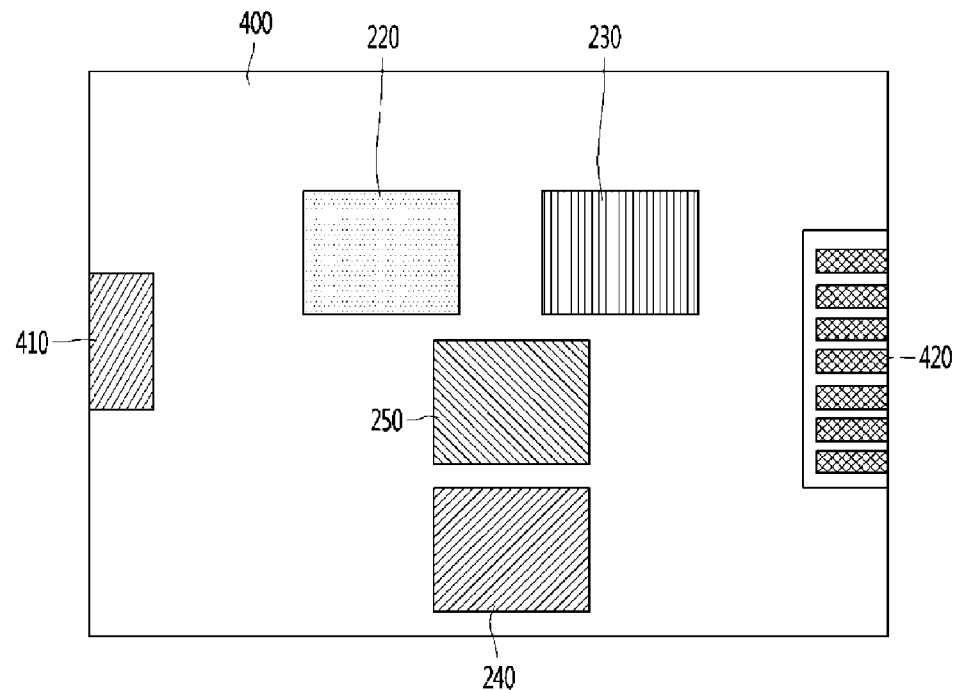
FIG. 5 is a view of an arrangement of a common driving module according to an embodiment.

Referring to FIG. 5 the common driving module 200 may include a substrate 400, and elements or components constituting the protection circuit 220, the DC-DC converter 230, the feedback circuit 240, and the pulse width modulator 250 may be arranged above the substrate 400 at predetermined intervals. The substrate 400 may be one of a resin-based printed circuit board (PCB), a metalcore PCB, a flexible PCB, a ceramic PCB, and an FR-4 substrate.

An input pad 410 may be arranged at a left end of the substrate 400, and an output pad 420 may be arranged at a right end of the substrate 400. The input pad 410 may be connected to the power supply, preferably the output terminal of the battery 210. The output pad 420 may be connected to the first to $N^{th}$ light emitting array modules 310, 320, and 330. A plurality of output pads 420 may be provided that corresponds to the number of the first to $N^{th}$ light emitting array modules 310, 320, and 330.

Figure 6:
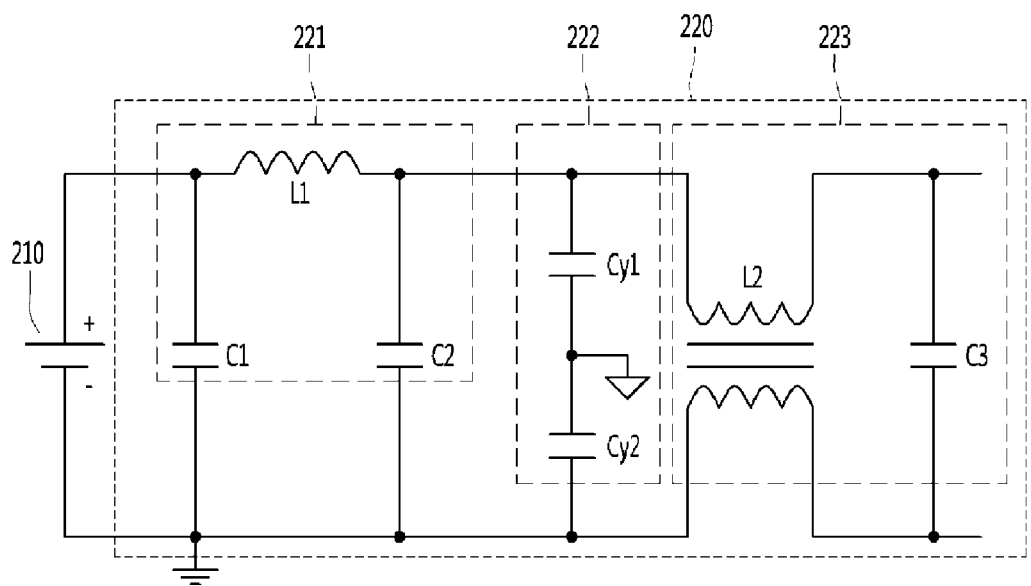
FIG. 6 is a view of a protection circuit unit of FIG. 4.

Referring to FIG. 6, the protection circuit 220 may include a DM filter 221, a Y capacitor 222, and a CM filter 223, which may be connected to the battery 210. The protection circuit 220 may be a noise removal unit that removes an electro magnetic interference (EMI) noise.

The EMI may be an electromagnetic interference and a noise source of an unwanted broadband noise that causes interference and hindrance to an electromagnetic wave due to a noise. Power noise may be classified into a common mode noise and a normal mode noise. The common mode noise may be a noise of a plus terminal and a noise of a minus terminal in a power supply flow in the same direction and may be referred to as a CM noise. The normal mode may be a noise of a plus terminal and a noise of a minus terminal in a power supply flow in opposite directions and may be referred to as a DM noise. A filter to reduce the common mode noise may be referred to as a CM filter, and a filter to reduce the normal mode noise may be referred to as a DM filter.

The DM filter 221 may be arranged to filter the DM noise. The DM filter 221 may include a first capacitor C1, a second capacitor C2, and a first inductor L1. The DM filter 221 may include a π-shaped capacitor. In the DM filter 221 that is a π filter, the DM noise may be absorbed by the capacitors C1 and C2 and filtering may be performed through the first inductor L1. Although the DM filter 221 removes DM noise, the DM filter 221 may be substantially an EMI filter and may be configured solely without a Y capacitor 222 or a CM filter 223. The protection circuit 220 may be configured to include the DM filter 221 alone.

The Y capacitor 222 may be arranged in a rear of the DM filter 221 and may emit noise to the ground. The Y capacitor 222 may include Y capacitors Cy1 and Cy2. The CM filter 223 may be arranged in a rear of the Y capacitor 222 and filter the CM noise. In a case where the EMI noise is not normally removed by using the DM filter 221 alone, the CM filter 223 may be further arranged so as to remove the noise through the ground. When the CM filter 223 is arranged, the Y capacitor 222 may be arranged between the DM filter 221 and the CM filter 223.

Figure 7:
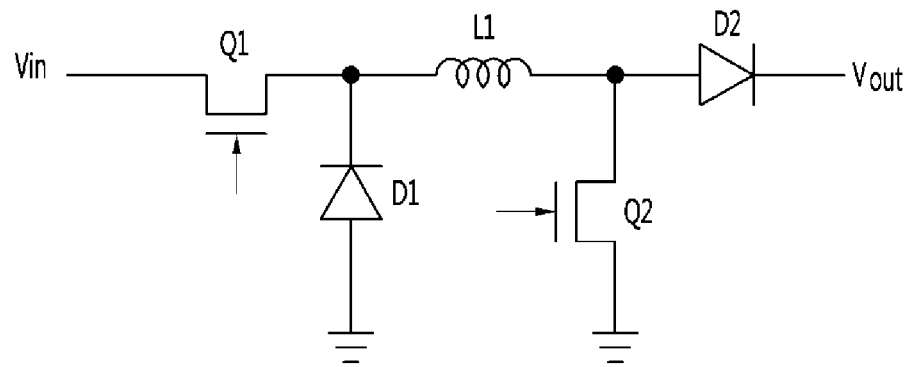
FIG. 7 is a first configuration of a DC-DC converter of FIG. 4.

FIG. 7 through FIG. 10 are various configurations of the DC-DC converter 230 illustrated in FIG. 4. Referring to FIG. 7, a first switching element Q1 may be arranged between the protection circuit 220 and the first inductor L1 and may be turned on and off according to the control of the pulse signal received from the pulse width modulator 250. When the first switching element Q1 is in a turned-on state and the second switching element Q2 is in a turned-off state, the DC-DC converter 230 may allow a current to flow toward a load through the first inductor L1. When the first switching element Q1 is changed to a turned-off state, the DC-DC converter 230 may transfer a reverse current to the load and the capacitor C1 due to energy stored in the first inductor L1 according to a direction of a first diode D1. That is, the DC-DC converter 230 may operate as a buck converter.

When both the first switching element Q1 and the second switching element Q2 are in a turned-on state, the DC-DC converter 230 may allow a current to flow through only the first inductor L1. When the second switching element Q2 is changed to a turned-off state, the DC-DC converter 230 may transfer a current to the load and the capacitor C1 due to energy stored in the first inductor L1 according to a direction of a second diode D2.

The first diode D1 and the second diode D2 may prevent reverse movement of a current that may be transferred from the first to $N^{th}$ light emitting array modules 310, 320, and 330 to the DC-DC converter 230. The first diode D1 and the second diode D2 may allow a current to flow in only one direction, for example, from the DC-DC converter 230 to the first to $N^{th}$ light emitting array modules 310, 320, and 330. Due to the above configuration, the DC-DC converter 230 may boost the input voltage received from the protection circuit 220 and output the boosted voltage to the first to $N^{th}$ light emitting array modules 310, 320, and 330.

Figure 8:
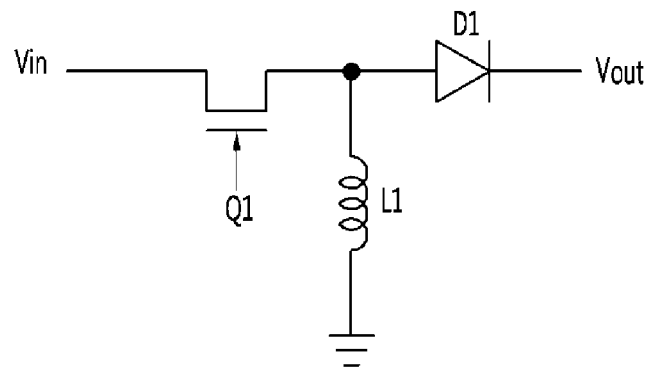
FIG. 8 is a second configuration of the DC-DC converter of FIG. 4.

Referring to FIG. 8, the DC-DC converter 230 may be a buck-boost converter. The DC-DC converter 230 may include a first switching element Q1, a first diode D1, and a first inductor L1. The first switching element Q1 may be connected in series to the input power. The first switching element Q1 may include a diode for reverse flow prevention. The first diode D1 may be connected in series to the first switching element Q1. The first inductor L1 may be connected in parallel to the first switching element Q1.

In the DC-DC converter 230, the first switching element Q1 may be turned on by a pulse signal provided during a first period, and the input voltage may be charged to the first inductor L1 by the turn-on of the first switching element Q1. In the DC-DC converter 230, the first switching element Q1 may be turned off by a pulse signal provided during a second period, and an inductor voltage charged in the first inductor L1 may be supplied to the first to $N^{th}$ light emitting array modules 310, 320, and 330.

Figure 9:
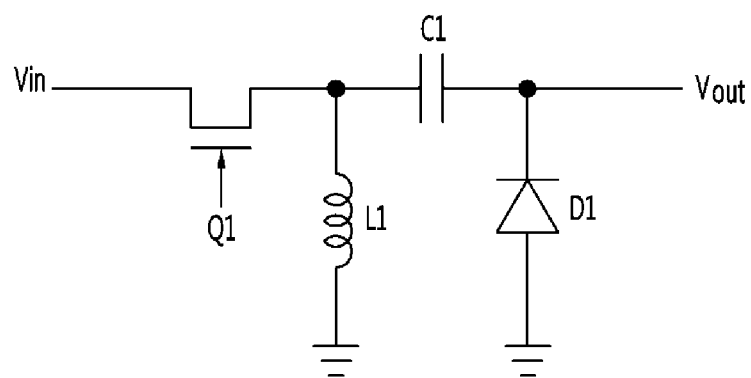
FIG. 9 is a third configuration of the DC-DC converter of FIG. 4.

Referring to FIG. 9, the DC-DC converter 230 may be a Zeta converter. To this end, the DC-DC converter 230 may include a first switching element Q1, a first inductor L1, a first capacitor C1, and a first diode D1. A drain terminal of the first switching element Q1 may be connected to the output terminal of the protection circuit 220, a gate terminal of the first switching element Q1 may be connected to the output terminal of the pulse width modulator 250, and a source terminal of the first switching element Q1 may be connected to one terminal of the first inductor L1 and one terminal of the first capacitor C1.

One terminal of the first inductor L1 may be connected to the source terminal of the first switching element Q1, and another terminal of the first inductor L1 may be grounded. One terminal of the first capacitor C1 may be connected to the source terminal of the first switching element Q1 and one terminal of the first inductor L1, and another terminal of the first capacitor C1 may be connected to a cathode terminal of the first diode D1. The cathode terminal of the first diode D1 may be connected to the other terminal of the first capacitor C1 and the output terminal of the DC-DC converter 230, and an anode terminal of the first diode D1 may be grounded.

Figure 10:
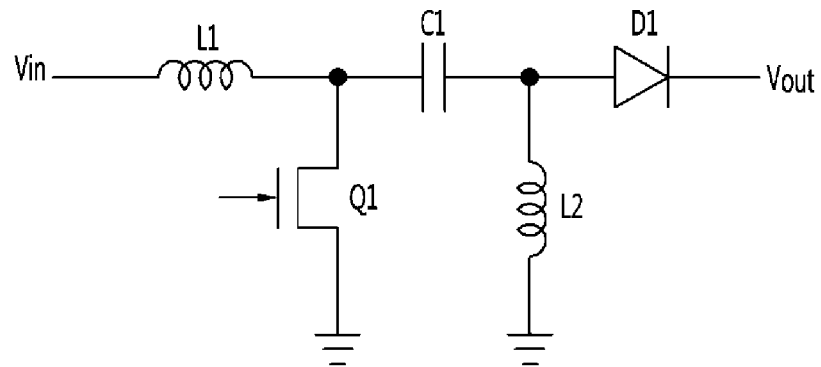
FIG. 10 is a fourth configuration of the DC-DC converter of FIG. 4.

Referring to FIG. 10, the DC-DC converter 230 may be a SEPIC converter. To this end, the DC-DC converter 230 may include a first switching element Q1, a first inductor L1, a second inductor L2, a first capacitor C1, and a first diode D1. One terminal of the first inductor L1 may be connected to the output terminal of the protection circuit 220, and the other terminal of the first inductor L1 may be connected to a drain terminal of the first switching element Q1 and one terminal of the first capacitor C1.

The drain terminal of the first switching element Q1 may be connected to the other terminal of the first inductor L1 and one terminal of the first capacitor C1, a gate terminal of the first switching element Q1 may be connected to the output terminal of the pulse width modulator 250, and a source terminal of the first switching element Q1 may be grounded. One terminal of the first capacitor C1 may be connected to the other terminal of the first inductor L1 and the drain terminal of the first switching element Q1, and the other terminal of the first capacitor C1 may be connected to one terminal of the second inductor L2 and an anode terminal of the first diode D1. The anode terminal of the first diode D1 may be connected to another terminal of the first capacitor C1 and one terminal of the second inductor L2, and a cathode terminal of the first diode D1 may be connected to the output terminal of the DC-DC converter 230, that is, the input terminals of the first to $N^{th}$ light emitting array modules 310, 320, and 330.

Figure 11:
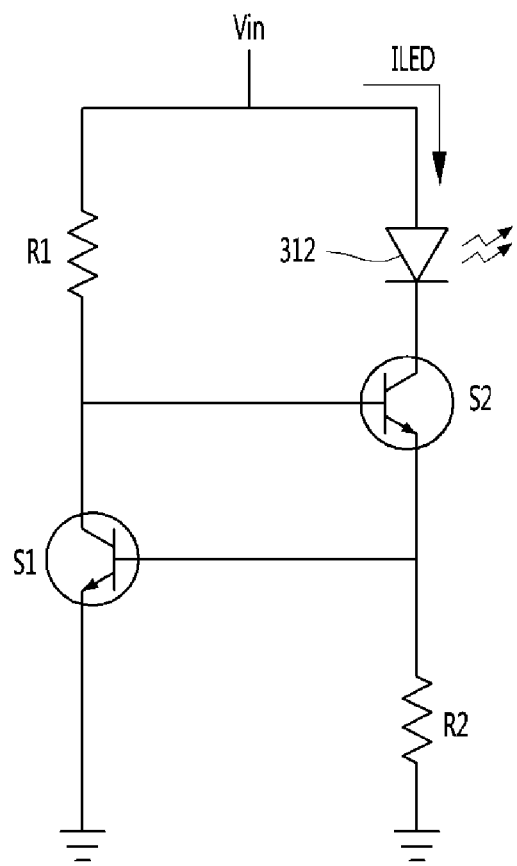
FIG. 11 is a first configuration of a light emitting array module of FIG. 3.
Figure 12:
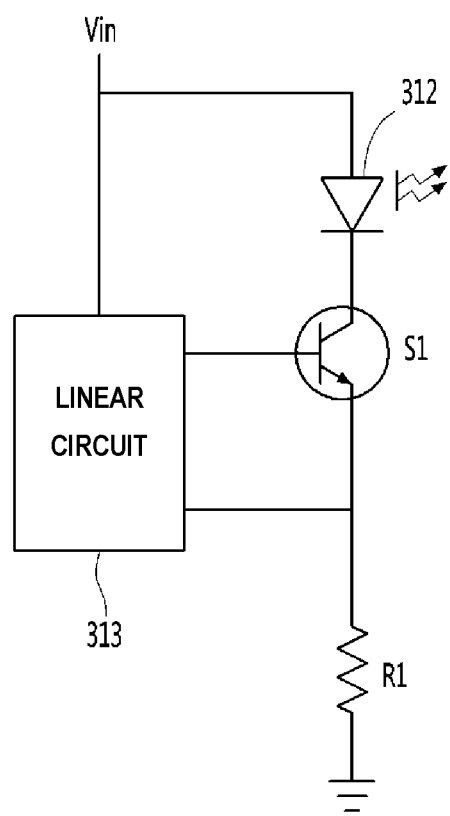
FIG. 12 is a second configuration of the light emitting array module of FIG. 3.
Figure 13:
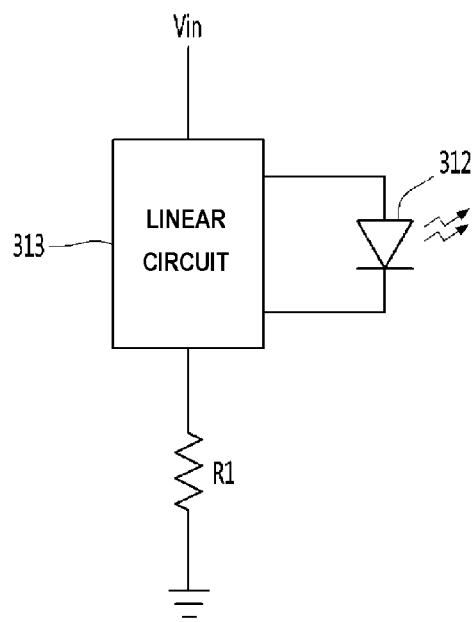
FIG. 13 is a third configuration of the light emitting array module of FIG. 3.

FIG. 11 through FIG. 13 are various configurations of the light emitting array module illustrated in FIG. 3. In FIG. 11 to FIG. 13, the light emitting array module may include the light emitting module 312 and the constant current control circuit for a general constant current control. The constant current control circuit may be a linear circuit. Referring to FIG. 11, the light emitting array module may include the light emitting module 312 and the individual driving module 311. The individual driving module 311 may include a first resistor R1, a first switching element S1, a second switching element S2, and a second resistor R2.

One terminal of the first resistor R1 may be connected to a power input terminal Vin, and another terminal of the first resistor R1 may be connected to a base terminal of the second switching element S2 and a collector terminal of the first switching element S1. The collector terminal of the first switching element S1 may be connected to the other terminal of the first resistor R1 and the base terminal of the second switching element S2, a base terminal of the first switching element S1 may be connected to an emitter terminal of the second switching element S2 and one terminal of the second resistor R2, and an emitter terminal of the first switching element S1 may be grounded.

A collector terminal of the second switching element S2 may be connected to the output terminal of the light emitting module 312, the base terminal of the second switching element S2 may be connected to the other terminal of the first resistor R1 and the collector terminal of the first switching element S1, and the emitter terminal of the second switching element S2 may be connected to the base terminal of the first switching element S1 and one terminal of the second resistor R2. One terminal of the second resistor R2 may be connected to the emitter terminal of the second switching element S2 and the base terminal of the first switching element S1, and the other terminal of the second resistor R2 may be grounded.

Referring to FIG. 12, the individual driving module 311 may include a linear circuit 313, a first switching element S1, and a first resistor R1. The first switching element S1 and the first resistor R1 may correspond to the second switching element S2 and the second resistor R2 in FIG. 11, respectively. In FIG. 12, the linear circuit 313 may be included in the individual driving module 311. Referring to FIG. 13, the individual driving module 311 may also be configured to include only the linear circuit 313 and the first resistor R1.

Figure 14:
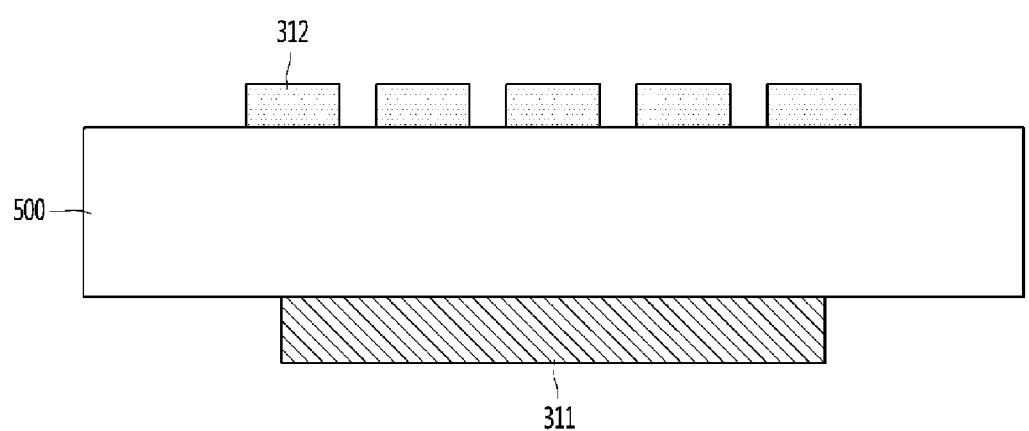
FIG. 14 is a view of an arrangement of a light emitting array module according to a first embodiment.

Referring to FIG. 14, a light emitting array module according to an embodiment may include a base substrate 500, light emitting modules 312, and an individual driving module 311. The base substrate 500 may be one of a resin-based PCB, a metalcore PCB, a flexible PCB, a ceramic PCB, and an FR-4 substrate.

The light emitting modules 312 and the individual driving module 311 may be mounted on the single base substrate 500. The light emitting modules 312 may be arranged on the top surface of the base substrate 500, and the individual driving module 311 may be arranged on the bottom surface of the base substrate 500.

Figure 15:
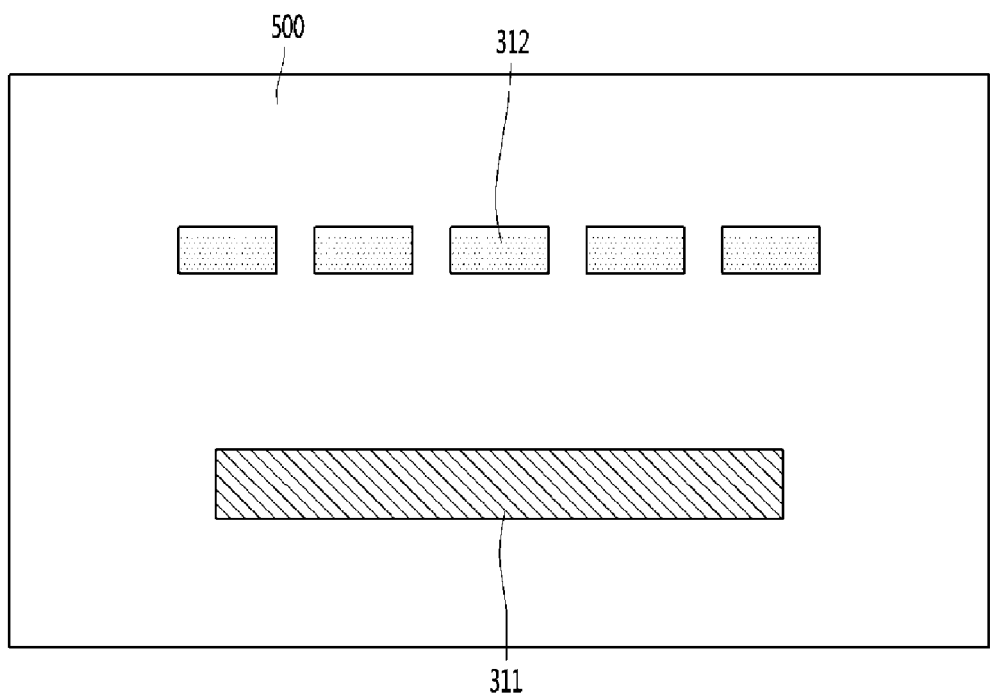
FIG. 15 is a view of an arrangement of a light emitting array module according to a second embodiment.

Referring to FIG. 15, the light emitting array module according to another embodiment may include a base substrate 500, light emitting modules 312, and an individual driving module 311. The base substrate 500 may be one of a resin-based PCB, a metalcore PCB, a flexible PCB, a ceramic PCB, and an FR-4 substrate.

The light emitting modules 312 and the individual driving module 311 may be mounted on the single base substrate 500. The light emitting modules 312 and the individual driving module 311 may be arranged on the same surface of the base substrate 500 at predetermined intervals. In this embodiment, the light emitting modules 312 and the individual driving module 311 may be arranged on the top surface of the base substrate 500 at predetermined intervals. The light emitting modules 312 may be arranged on the base substrate 500 in a horizontal axis direction.

Figure 16:
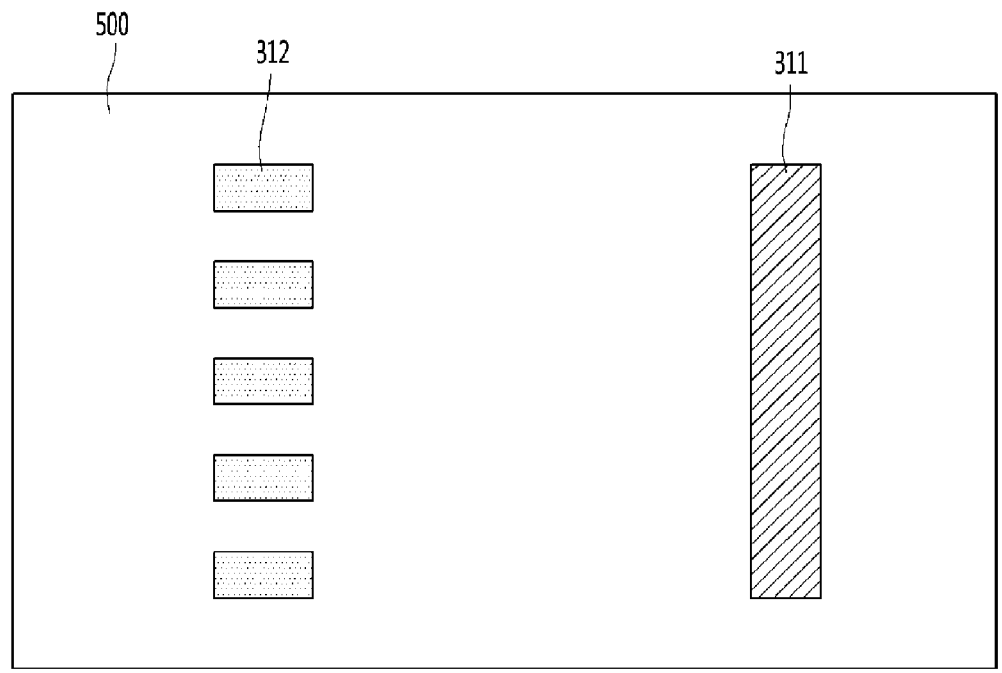
FIG. 16 is a view of an arrangement of a light emitting array module according to a third embodiment.

Referring to FIG. 16, the light emitting array module according to another embodiment may include a base substrate 500, light emitting modules 312, and an individual driving module 311. The base substrate 500 may be one of a resin-based PCB, a metalcore PCB, a flexible PCB, a ceramic PCB, and an FR-4 substrate.

The light emitting modules 312 and the individual driving module 311 may be mounted on the single base substrate 500. The light emitting modules 312 and the individual driving module 311 may be arranged on the same surface of the base substrate 500 at predetermined intervals. In this embodiment, the light emitting modules 312 and the individual driving module 311 may be arranged on the top surface of the base substrate 500 at predetermined intervals.

The light emitting modules 312 may be arranged on the base substrate 500 in a vertical axis direction. The light emitting modules 312 may be arranged in a vertical direction in a left region of the top surface of the base substrate 500, and the individual driving module 311 may be arranged in a vertical direction in a right region of the top surface of the base substrate 500.

Figure 17:
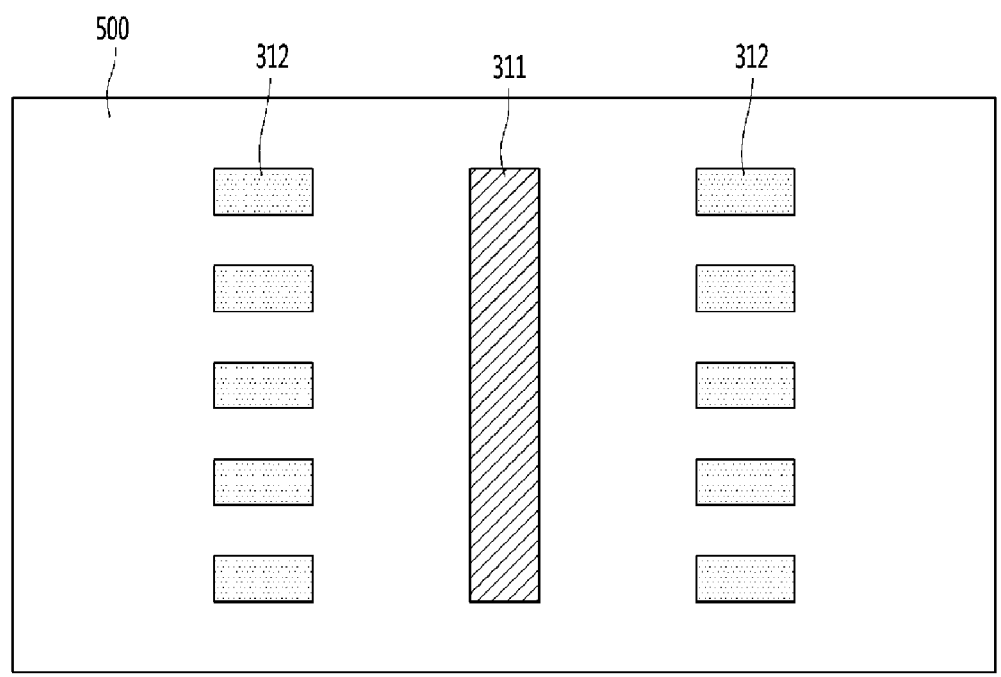
FIG. 17 is a view of an arrangement of a light emitting array module according to a fourth embodiment.

Referring to FIG. 17, the light emitting array module according to another embodiment may include a base substrate 500, light emitting modules 312, and an individual driving module 311. The base substrate 500 may be one of a resin-based PCB, a metalcore PCB, a flexible PCB, a ceramic PCB, and an FR-4 substrate.

The light emitting modules 312 and the individual driving module 311 may be mounted on the single base substrate 500. The light emitting modules 312 and the individual driving module 311 may be arranged on the same surface of the base substrate 500 at predetermined intervals. In this embodiment, the light emitting modules 312 and the individual driving module 311 may be arranged on the top surface of the base substrate 500 at predetermined intervals.

The light emitting modules 312 may be arranged on the base substrate 500 in a vertical axis direction. The light emitting modules 312 may be arranged in a vertical direction in a left region and a right region of the top surface of the base substrate 500, and the individual driving module 311 may be arranged in a vertical direction in a middle region of the top surface of the base substrate 500.

Figure 18:
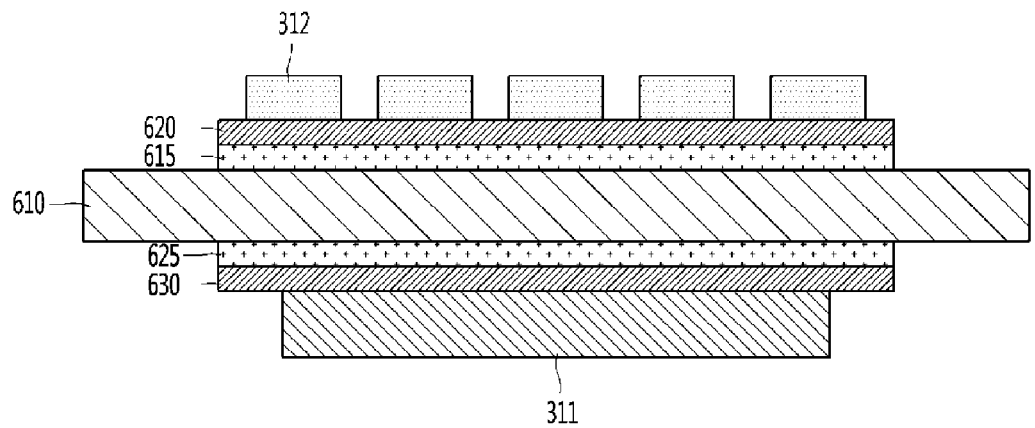
FIG. 18 is a view of an arrangement of a light emitting array module according to a fifth embodiment.

Referring to FIG. 18, the light emitting array module according to another embodiment may include light emitting modules 312 and an individual driving module 311. The light emitting modules 312 and the individual driving module 311 may be respectively attached on opposite surfaces of a thermally conductive substrate 610 through the medium of different base substrates 620 and 630, with the thermally conductive substrate 610 being provided between the light emitting modules 312 and the individual driving module 311.

The light emitting array module may include the thermally conductive substrate 610, a first bonding layer 615, the first substrate 620, the light emitting modules 312, a second bonding layer 625, the second substrate 630, and the individual driving module 311. The first substrate 620 and the second substrate 630 may be one of a resin-based printed circuit board (PCB), a metalcore PCB, a flexible PCB, a ceramic PCB, and an FR-4 substrate.

The light emitting module 312 may include a light emitting element arranged above the first substrate 620 to emit light, and may be a concept encompassing a light source. For example, a solid light emitting element may be applied to the light emitting module 312. The solid light emitting element may be any one selected from an LED, an OLED, a laser diode (LD), a laser, and a vertical-cavity surface-emitting laser (VCSEL).

The first substrate 620 may configure the light emitting module 312 by mounting a plurality of light emitting elements. A plurality of electrode lines may be exposed so that the light emitting element such as the LED may be mounted, and the electrode lines may be electrically connected to the light emitting elements. The light emitting element may be mounted in a through-hole of the first substrate 620 and be electrically connected to the electrode line, and the light emitting element may be fixed by integrating a reflection member having a radial reflection surface on one side by using an epoxy rein or the like.

The second substrate 630 may be arranged on the bottom surface of the thermally conductive substrate 610, and driving elements or devices constituting the individual driving module 311 are mounted on the exposed surface of the second substrate 630. The first bonding layer 615 may be arranged between the thermally conductive substrate 610 and the first substrate 620, and the second bonding layer 625 may be arranged between the thermally conductive substrate 610 and the second substrate 630. The first substrate 620 and the second substrate 630 may include a plurality of through-holes, such as a via hole for mounting a chip, a via hole for electrical connection of each layer, and a via hole for thermal diffusion.

The thermally conductive substrate 610 may be a heat sink and receive heat generated by the light emitting module 312 and discharge the heat to the outside and may support the PCB on which the light emitting elements and the driving devices of the individual driving module 311 may be mounted. A thermally conductive plastic may be applied to the thermally conductive substrate 610. For example, the thermally conductive substrate 610 may be implemented with a plastic substrate such as polycarbonate (PC), or a resin material (e.g., thermally conductive acrylic interface elastomer) having excellent electrical insulation characteristics, excellent heat resistance, and a long lifespan may be applied thereto.

A metal substrate having excellent thermal conductivity may be applied to the thermally conductive substrate 610. A substrate using aluminum or an aluminum alloy may be applied. If the thermally conductive substrate 610 is made of aluminum or an alloy thereof, the thermally conductive substrate 610 may be extruded to have a thin plate shape and then pressed so as to improve heat sink performance and manufacturing efficiency. Accordingly, the thermally conductive substrate 610 may have high thermal conductivity of about 200 W/mK.

The thermally conductive substrate 610 may be made of a material such as magnesium, beryllium, aluminum, zirconium, thorium, or lithium. For example, the thermally conductive substrate 610 may be extruded by using a material having 90% or more of magnesium content, and various materials such as beryllium, aluminum, zirconium, thorium, and lithium may be added to the remaining 10% of content so as to improve physical properties such as heat resistance and oxidation resistance.

The first substrate 620 and the second substrate 630 may be formed to have substantially a same width. When the first substrate 620 and the second substrate 630 are formed to have the same width, the same bonding regions may be formed above and below the thermally conductive substrate 610. Accordingly, it may be possible to improve bonding reliability and to improve heat sink characteristics by increasing a surface exposure region of the thermally conductive substrate 610.

Figure 19:
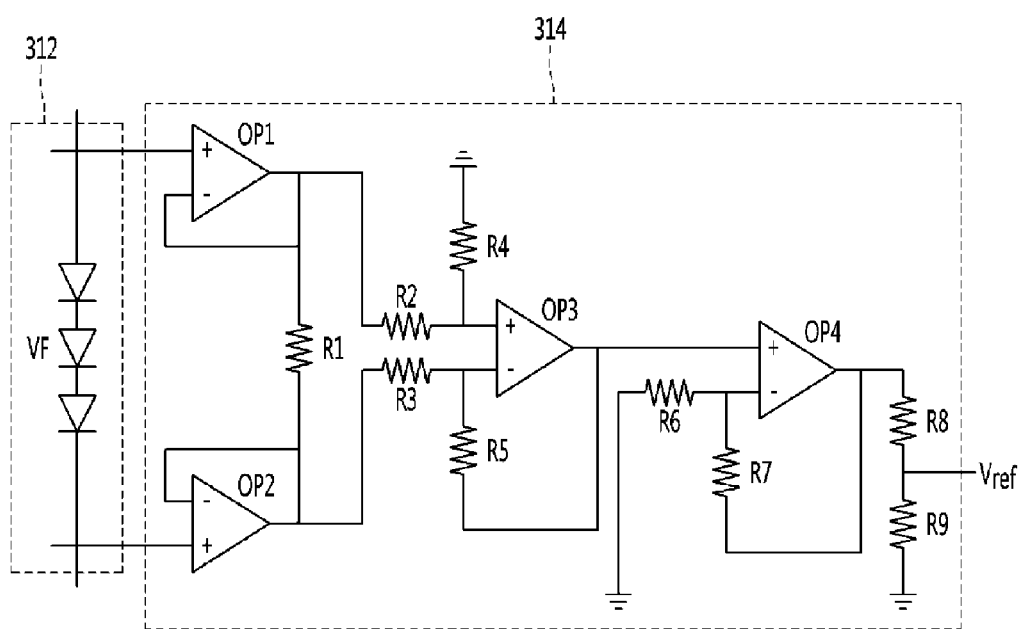
FIG. 19 is a view of a differential circuit according to an embodiment.

Referring to FIG. 19, a differential circuit according to an embodiment may be included in a light emitting array module having the highest operating voltage VF among the first to $N^{th}$ light emitting array modules 310, 320, and 330. The differential circuit may be arranged in a light emitting array module having the highest operating voltage VF among the first to $N^{th}$ light emitting array modules 310, 320, and 330, and may detect a change in the operating voltage of the light emitting module 312 constituting the light emitting array module.

The reference voltage $V_{ref}$ may be inputted to the positive (+) terminal of the comparator 241, and the reference voltage $V_{ref}$ may be set based on the maximum operating voltage among the operating voltages of the first to $N^{th}$ light emitting array modules 310, 320, and 330. When the maximum operating voltage is varied according to the state of the light emitting module 312, a difference may occur between the output voltage Vo of the common driving module 200 and the reference voltage $V_{ref}$, causing generation of heat.

The differential circuit according to the embodiment may be installed in the light emitting array module having the maximum operating voltage, detect the operating voltage of the light emitting module 312 of the light emitting array module, and supply the operating voltage to the common driving module 200. In the differential circuit 314, a positive (+) terminal of a first comparator OP1 and a positive (+) terminal of a second comparator OP2 may be respectively connected to an anode terminal and a cathode terminal of the light emitting module having the maximum operating voltage among the plurality of light emitting modules 312.

A first resistor R1 may be connected between a negative (−) terminal of the first comparator OP1 and a negative (−) terminal of the second comparator OP2. A second resistor R2 connected to an output terminal of the first comparator OP1 and a fourth resistor R4 may be connected in parallel to a positive (+) terminal of a third comparator OP3, and a third resistor R3 connected to an output terminal of the second comparator OP2 and a fifth resistor R5 may be connected in parallel to a negative (−) terminal of the third comparator OP3.

A positive (+) terminal of a fourth comparator OP4 may be connected to an output terminal of the third comparator OP3, and a negative (−) terminal of the fourth comparator OP4 may be connected in parallel to a sixth resistor R6 and a seventh resistor R7. An output voltage of the fourth comparator OP4 may be adjusted by an eighth resistor R8 and a ninth resistor R9, and the differential circuit 314 may output the adjusted voltage to the feedback circuit 240. The differential circuit 314 may detect a voltage across the light emitting module having the highest operating voltage among the light emitting modules 312, generate the reference voltage $V_{ref}$, and output the generated reference voltage $V_{ref}$ to the feedback circuit 240.

The driving devices constituting each of the light emitting modules may include a controller and a heat generation adjuster. The heat generation adjuster may be arranged between the controller and the ground and distributes power supplied to the controller. The heat generation adjuster may include a plurality of resistors.

Figure 20:
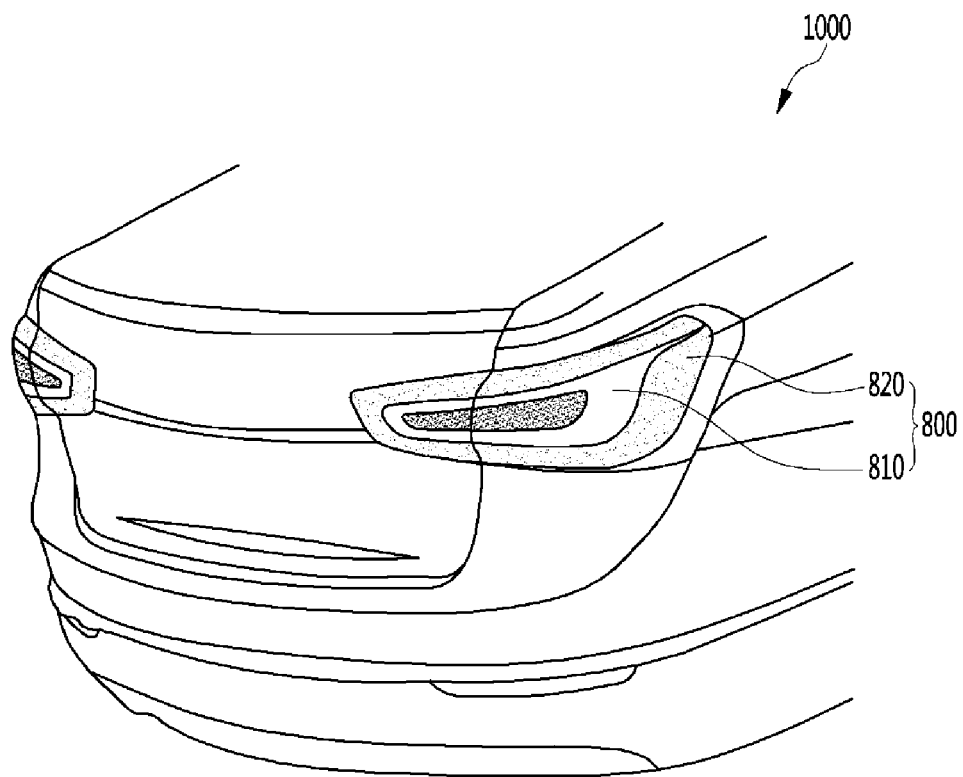
FIGS. 20 to 22 are views of an automotive lighting according to an embodiment.
Figure 21:
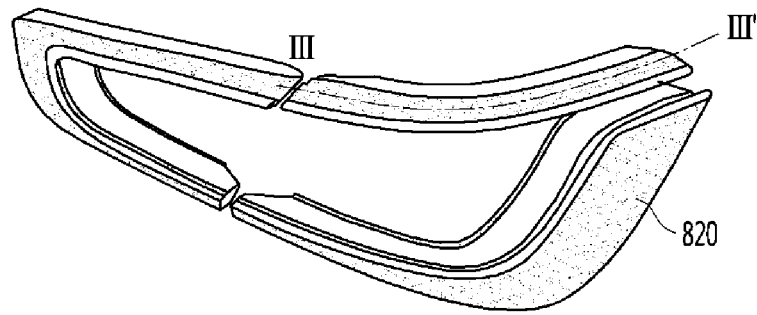
Figure 22:
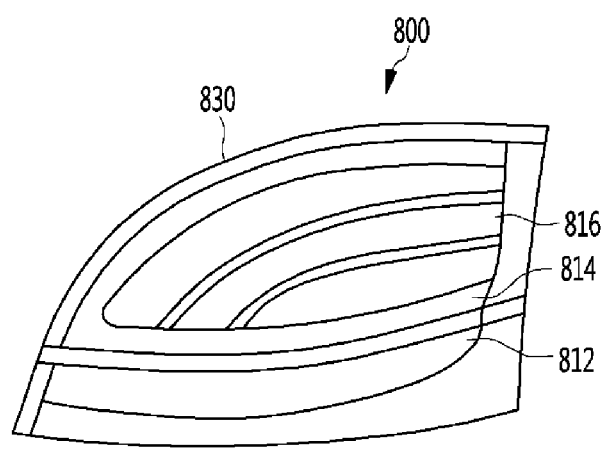

FIG. 20 to FIG. 22 are views illustrating an automotive lighting according to embodiments. Referring to FIG. 20 to FIG. 22, a head lamp may be provided on a front side of a vehicle 1000, and a tail lamp 800 may be provided on a rear side of the vehicle 1000. The automotive lighting according to the embodiment may be described by using the tail lamp unit 800 as an example.

The tail lamp unit 800 of the vehicle 1000 may be provided on a curved surface of the vehicle 1000. The tail lamp unit 800 may includes a plurality of lamps. The tail lamp unit 800 may allow a driver of another vehicle and/or a pedestrian to know information on a vehicle operation state, such as, e.g., braking, backup, left and right widths of the vehicle 1000, and direction indication, by using lighting of each lamp. For example, the tail lamp unit 800 may include the light emitting array module 300 described above. The common driving module 200 that supplies the common operating voltage to all the lamp units included in the vehicle 1000 may be provided in one region of the vehicle 1000. The light emitting array modules constituting the tail lamp unit 800 may be driven by the operating voltage supplied from the common driving module 200 and generate light.

When viewed from 45 degrees at a horizontal angle of an outer axis of a vehicle with respect to a central point, a projected area of the tail lamp unit 800 may be about 12.5 $cm^2$ or more. For example, brightness for braking must be about 40 cd to about 420 cd so as to satisfy safety criteria. When light intensity is measured in a light intensity measurement direction, the tail lamp unit 800 may provide light intensity of a reference value or more. However, the scope of the embodiments may be not limited to the safety criteria and the required light intensity related to the tail lamp unit 800, and may also be applied even when the safety criteria or the required light intensity are different.

The entire tail lamp unit 800 may have a curved surface. A part of the tail lamp unit 800 may have a curved surface, and a remaining part of the tail lamp unit 800 may not have a curved surface. A first lamp 810 arranged in a central portion of the tail lamp unit 800 may not have a curved surface, and a second lamp 820 arranged in a peripheral portion of the tail lamp unit 800 may have a curved surface. However, the embodiments are limited thereto. The first lamp 810 arranged in the central portion of the tail lamp unit 800 may have a curved surface, and the second lamp 820 arranged in the peripheral portion of the tail lamp unit 800 may not have a curved surface. FIG. 21 illustrates a lamp arranged in a peripheral portion of a tail lamp unit and having a curved surface.

As illustrated in FIG. 22, the tail lamp unit 800 may include a first lamp unit 812, a second lamp unit 814, a third lamp unit 816, and a housing 830. The first lamp unit 812 may be a light source that serves as a turn signal lamp, the second lamp unit 814 may be a light source that serves as a position lamp, and the third lamp unit 816 may be a light source that serves as a stop lamp, but the embodiments are not limited thereto. The first to third lamp units 812, 814, and 816 may exchange roles with one another.

The housing 830 may accommodate the first to third lamp units 812, 814, and 816 and may be made of a light-transmitting material. The housing 830 may be curved according to the design of a vehicle body, and the first to third lamp units 812, 814, and 816 may implement a bendable surface light source according to the shape of the housing 830.

A surface light source may be implemented with a small number of light sources by forming a plurality of light emitting elements having different arrangement directions with respect to a preset reference direction and a light mixing area in an empty space between a light source and an optical system. Each of the first to third lamp units 812, 814, and 816 may constitute each light emitting array module as described above and may include a light emitting element that generates light, and an individual driving module that controls an operating current of the light emitting element. The common operating voltage may be supplied to the first to third lamp units 812, 814, and 816 through the single common driving module 200.

In the description of embodiments, it may be understood that when a layer (film), region, pattern, or structures may be referred to as being "on/above" or "below/under" a substrate, another layer (film), region, pad, or patterns, it may be directly on or below another layer (film), region, pad, or patterns, and one or more intervening layer may also be present therebetween.

According to embodiments disclosed herein, some of the driving modules may be standardized to be commonly usable in the plurality of light emitting modules, thereby reducing the number of driving modules and minimizing unit costs and product volume. Since the common driving modules or module may be configured by excluding the constant current circuit that must be designed according to the specifications of each light emitting module within the common driving module, the size of the substrate constituting the common driving module may be reduced and thus product volume may be minimized, thereby improving a degree of freedom of design.

Heat generation of each light emitting module may be minimized by minimizing an output voltage of the common driving module. The individual driving module and the light emitting module may be integrated into a single package, thereby minimizing product volume and reducing unit costs.

The maximum operating voltage among the operating voltages of the plurality of light emitting modules may be set as the output voltage of the common driving module, and the output voltage may be varied according to the change in the maximum operating voltage, thereby improving heat generation caused by a difference between the output voltage and the operating voltage.

Embodiments disclosed herein provide a light emitting device having a novel structure, and an automotive lighting including the light emitting device. Embodiments also provide a light emitting device in which driving modules to supply driving power to light emitting modules may be divided into a common driving module, which may be commonly usable, and an individual driving module, which may be provided in each light emitting module, and an automotive lighting including the light emitting device.

Embodiments also provide a light emitting device in which a light emitting module and an individual driving module individually used in the light emitting module may be integrated into a single module, and an automotive lighting including the light emitting device. Embodiments provide a light emitting device capable of performing a constant voltage control and a constant current control even though an operating voltage of a load changes, and an automotive lighting including the light emitting device.

According to an embodiment disclosed herein, a light emitting device may include a plurality of light emitting array modules each including at least one light emitting element; and a common driving module commonly connected to the plurality of light emitting array modules and configured to supply an operating voltage to each of the connected light emitting array modules. Each of the plurality of light emitting array modules may include a light emitting module including the at least one light emitting element and an individual driving module configured to receive the operating voltage supplied from the common driving module and output an operating current to the light emitting module based on the received operating voltage.

The common driving module may be physically separated from the individual driving module included in each of the plurality of light emitting array modules. The common driving module may include a power input configured to receive input power, a DC-DC converter including at least one switching element or switch and configured to output the operating voltage by converting the input power according to a switching operation of the switching element, a feedback circuit configured to compare an output voltage of the DC-DC converter with a preset reference voltage and output a control value based on the comparison result, and a pulse width modulator configured to output a pulse signal to the DC-DC converter by using the control value outputted by the feedback circuit.

The DC-DC converter may include any one of a buck converter, a boost converter, a buck-boost converter, a buck & boost converter, a Zeta converter, and a SEPIC converter. The feedback circuit may include a voltage-dividing resistor connected to an output terminal of the DC-DC converter and a comparator configured to compare a voltage outputted through the voltage-dividing resistor with the reference voltage and output the control value. The reference voltage may be set based on a highest operating voltage among operating voltages of the light emitting modules of the plurality of light emitting array modules.

Each of the plurality of light emitting array modules may include a first substrate, the at least one light emitting element arranged above the first substrate and constituting the light emitting module, and a driving device arranged below the first substrate and constituting the individual driving module. Each of the plurality of light emitting array modules may include a first substrate, the at least one light emitting element arranged above the first substrate and constituting the light emitting module, and a driving device arranged above the first substrate and spaced apart from the at least one light emitting element at a predetermined interval and constituting the individual driving module.

Each of the plurality of light emitting array modules may include a thermally conductive substrate, a first substrate arranged or provided above the thermally conductive substrate, a second substrate arranged or provided below the thermally conductive substrate, the at least one light emitting element arranged or provided above the first substrate and constituting the light emitting module; and a driving device arranged or provided below the second substrate and constituting the individual driving module. The driving device may include a linear circuit configured to control the operating current.

A first light emitting array module among the plurality of light emitting array modules may further include a differential circuit configured to generate the reference voltage based on the operating voltage of the light emitting module and supply the generated reference voltage to the comparator. The first light emitting array module may include a light emitting module having a highest operating voltage among the plurality of light emitting array modules.

According to embodiments disclosed herein, an automotive lighting may include a lens housing, a plurality of light emitting array modules arranged or provided in the lens housing, a lens arranged or provided in front of the light emitting array module, a common driving module commonly connected to the plurality of light emitting array modules and configured to supply an operating voltage to each of the plurality of light emitting array modules. The common driving module may commonly supply a same operating voltage to the plurality of light emitting array modules.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light emitting device comprising:
   a plurality of light emitting array modules each including at least one light emitting element; and
   a common driving module commonly connected to the plurality of light emitting array modules and configured to supply an operating voltage to each of the connected light emitting array modules includes:
   a light emitting module including the at least one light emitting element; and
   an individual driving module configured to receive the operating voltage supplied from the common driving module and output an operating current to the light emitting module based on the received operating voltage,
   wherein the common driving module includes:
   a power input unit configured to receive input power;
   a DC-DC converter including at least one switch and configured to output the operating voltage by converting the input power according to a switching operation of the switch;
   a feedback unit configured to compare an output voltage of the DC-DC converter with a preset reference voltage and output a control value based on the comparison result; and
   a pulse width modulation unit configured to output a pulse signal to the DC-DC converter by using the control value outputted by the feedback circuit,
   wherein the feedback unit includes:
   a voltage-dividing resistor connected to an output terminal of the DC-DC converter; and
   a comparator configured to compare a voltage outputted through the voltage-dividing resistor with the reference voltage and output the control value,
   wherein a first light emitting array module among the plurality of light emitting array modules further includes a differential circuit unit configured to generate the reference voltage based on the operating voltage of the light emitting module and supply the generated reference voltage to the comparator.

2. The light emitting device of claim 1, wherein the common driving module is physically separated from the individual driving module included in each of the plurality of light emitting array modules.

3. The light emitting device of claim 1, wherein the DC-DC converter includes any one of a buck converter, a boost converter, a buck-boost converter, a buck & boost converter, a Zeta converter, and a SEPIC converter.

4. The light emitting device of claim 1, wherein the reference voltage is set based on a highest operating voltage among operating voltages of the light emitting modules of the plurality of light emitting array modules.

5. The light emitting device of claim 1, wherein each of the plurality of light emitting array modules includes:
   a first substrate;
   a light emitting module on the first substrate and including the light emitting element; and
   a driving element arranged below the first substrate and constituting the individual driving module.

6. The light emitting device of claim 5, wherein the driving element includes:
   a control element configured to control the light emitting element; and
   a heat generation adjustor arranged between the controller and a ground and configured to distribute power to be supplied to the controller.

7. The light emitting device of claim 1, wherein each of the plurality of light emitting array modules includes:
   a first substrate;
   a light emitting module on the first substrate and including the light emitting element; and a driving element arranged above the first substrate and spaced apart from the at least one light emitting element at a predetermined interval and constituting the individual driving module.

8. The light emitting device of claim 1, wherein each of the plurality of light emitting array modules includes:
a thermally conductive substrate;
a first substrate arranged above the thermally conductive substrate;
a second substrate arranged below the thermally conductive substrate;
a light emitting module on the first substrate and including the light emitting element; and
a driving element arranged below the second substrate and constituting the individual driving module.

9. The light emitting device of claim 5, wherein the driving element includes a linear circuit unit configured to control the operating current.

10. The light emitting device of claim 9, wherein the first light emitting array module includes a light emitting module having a highest operating voltage among the plurality of light emitting array modules.

11. An automotive lighting comprising:
a lens housing;
a plurality of light emitting array modules provided in the lens housing;
a lens provided in front of the light emitting array modules,
a common driving module commonly connected to the plurality of light emitting array modules and configured to supply an operating voltage to each of the plurality of light emitting array modules; wherein the common driving module commonly supplies the same operating voltage to the plurality of light emitting array modules,
wherein each of the plurality of light emitting array modules includes:
a light emitting module including at least one light emitting element; and
an individual driving module configured to receive the operating voltage supplied from the common driving module and output an operating current to the light emitting module based on the received operating voltage,
wherein the common driving module includes:
a power input configured to receive input power;
a DC-DC converter including at least one switch and configured to output the operating voltage by converting the input power according to a switching operation of the switch;
a feedback unit configured to compare an output voltage of the DC-DC converter with a preset reference voltage and output a control value based on the comparison result; and
a pulse width modulator configured to output a pulse signal to the DC-DC converter by using the control value outputted by the feedback unit, and
wherein a first light emitting array module among the plurality of light emitting array modules further includes a differential circuit unit configured to generate the reference voltage based on the operating voltage of the light emitting module and supply the generated reference voltage to the comparator.

12. The automotive lighting of claim 11, wherein the common driving module is physically separated from the individual driving module included in each of the plurality of light emitting array modules.

13. The automotive lighting of claim 11, wherein the reference voltage is set based on a highest operating voltage among operating voltages of the light emitting modules of the plurality of light emitting array modules.

14. The automotive lighting of claim 9, wherein the first light emitting array module is a light emitting array module including a light emitting module having a highest operating voltage among the plurality of light emitting array modules.

* * * * *